(12) United States Patent
Pershikova et al.

(10) Patent No.: US 9,145,513 B2
(45) Date of Patent: Sep. 29, 2015

(54) PROPPANT AND METHOD FOR HIGHER PRODUCTION OF A WELL

(75) Inventors: Elena Pershikova, Moscow (RU); Joseph Eamonn O'Neill, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1345 days.

(21) Appl. No.: 12/527,711

(22) PCT Filed: Mar. 20, 2007

(86) PCT No.: PCT/RU2007/000137
§ 371 (c)(1),
(2), (4) Date: Apr. 12, 2010

(87) PCT Pub. No.: WO2008/105678
PCT Pub. Date: Sep. 4, 2008

(65) Prior Publication Data
US 2010/0193189 A1    Aug. 5, 2010

(30) Foreign Application Priority Data
Feb. 28, 2007  (RU) .............................. 2007107435

(51) Int. Cl.
C09K 8/80 (2006.01)
E21B 43/267 (2006.01)
(52) U.S. Cl.
CPC ....................................... C09K 8/80 (2013.01)
(58) Field of Classification Search
USPC ....................................... 166/280.2; 507/271
See application file for complete search history.

(56) References Cited

U.S. PATENT DOCUMENTS

| 3,929,191 | A | 12/1975 | Graham |
| 4,427,068 | A | 1/1984 | Fitzgibbon |
| 4,440,866 | A | 4/1984 | Lunghofer et al. |
| 4,522,731 | A | 6/1985 | Lunghofer |
| 4,879,181 | A | 11/1989 | Fitzgibbon |
| 5,188,175 | A | 2/1993 | Sweet |
| 7,459,209 | B2 * | 12/2008 | Smith et al. .................. 428/403 |
| 2003/0195121 | A1 * | 10/2003 | Fitzgerald ..................... 507/269 |

FOREIGN PATENT DOCUMENTS

| CN | 1844298 A | | 10/2006 |
| GB | 2037727 | * | 7/1980 |
| RU | 2098618 | | 12/1997 |
| RU | 2166079 | | 4/2001 |
| SU | 691073 | | 10/1979 |

OTHER PUBLICATIONS

International Search Report for the equivalent PCT patent application No. PCT/RU2007/000137.
API, "API RP-56/58/60 Proppant Crush Test for Frac Sand, Resin Coated Sand, Ceramic Proppant", Retrieved from http://www.testresources.net/standards/api/api-rp-60-hydro-fracking-proppant-crush-resistnace/, Accessed Aug. 22, 2014.

* cited by examiner

*Primary Examiner* — John J Figueroa
(74) *Attorney, Agent, or Firm* — Jeremy D. Tillman; Rachel E. Greene; Tim Curington

(57) ABSTRACT

This invention relates to the oil and gas industry and can be used to prevent fracture closure by pumping special particulates (proppant) into the fracture after reservoir hydraulic fracturing. According to the invention, the proppant is particulates of sintered ceramic material which are shaped ideal spheres. The use of this type of proppant may increase the well production by 25%.

10 Claims, No Drawings

PROPPANT AND METHOD FOR HIGHER PRODUCTION OF A WELL

This invention relates to the oil and gas industry and can be used for enhancement of well production through the use of proppant and hydraulic fracturing for oil-bearing reservoirs.

Hydraulic fracturing of a reservoir is a well-established technique for enhancement of well production. The key element of hydraulic fracturing for reservoir treatment is high-pressure pumping of a viscous fluid into oil or gas pay reservoir: this procedure creates fractures in the reservoir. To keep these fractures open, spherical particulates (proppant) are added into the pumped fluid. The proppant is delivered by fluid into the fracture and fill the fracture and makes up a grained structure, which is penetrable for gas and oil flow from the reservoir towards the borehole. Proppants are designed to hold a high closure pressure and withhold the impact of corrosive formation fluids (water, sour gases, brine) at high formation temperatures. Depending on operating conditions for proppant, the raw material for their production may be chosen from quartz sand, bauxite, kaolinite clay, alumina, and different kinds of aluminum silicate minerals.

The important parameters of proppant grains are their roundness and sphericity and uniformity in size and shape. These properties are critical for permeability of proppant pack and, therefore, for conductivity of hydrocarbon fluids through the open space of proppant pack.

Most of commercial proppants today have not spherical shape (except glass beads) but rather spheroids. Indirectly this is confirmed by existence of Krumbein & Sloss chart used in this industry: the chart describes the perfection of proppant grain shape. But the chart even has no value 1 corresponding to a perfectly spherical shape of proppant. The Pat. No. RU2,098,618 describes the use of proppant grains with perfect spherical shapes (glass beads) but their practical application is restricted by low mechanical strength of beads.

U.S. Pat. No. 4,879,181 discloses a proppant manufacture from a mixture of bauxite and kaolinite clay. The initial material for shaping of a proppant has proper elasticity; this makes higher the parameters of roundness and sphericity for proppant grains (up to 0.7 by the Krumbein chart).

The shortcoming of this proppant is insufficient sphericity that reduces the free flow area between proppant grains; this reduces the formation fluid flow rate though the proppant pack.

The U.S. Pat. No. 5,188,175 disclose the manufacturing method of ceramic spheroids made from sintered kaolinite clay, also comprising alumina, silica, iron and titanium oxides. The oxide composition of this material is the following (wt. %): alumina—25-40, silica—50-65, iron oxide—1.6, and titanium oxide—2.6. The sphericity of grains produced is 0.7. This type of proppant is mostly efficient for treatment of oil and gas reservoirs at low or moderate depths.

The shortcoming of this proppant is insufficient sphericity that reduces the free flow area between proppant grains; this reduces the formation fluid flow rate though the proppant pack.

The U.S. Pat. No. 3,929,191 discloses a proppant for oil production stimulation through technique of hydraulic fracturing: the proppant is obtained by the sintering of aluminum silicate mineral or made from steel or iron and shaped in the form of grains with sizes 6-100 mesh, preferably 10-40 mesh; the grain sphericity and roundness by the Krumbein chart above 0.8, the density is 2.6 g/cm$^3$; the particulate material coated with a solid fusible phenolic resin.

The shortcoming of this proppant is insufficient sphericity that reduces the free flow area between proppant grains; this reduces the formation fluid flow rate though the proppant pack.

The closest analog to our Invention is the proppant disclosed in U.S. Pat. No. 3,929,191 used in hydrofracturing of subterranean formations; the proppant is made from sintered aluminum silicate mineral in the granular shape with sizes 6-100 mesh, preferably 10-40 mesh, with the roundness and sphericity the Krumbein chart above 0.8, the density is 2.6 g/cm$^3$; the particulate material coated with a solid fusible phenolic resin.

The shortcoming of this proppant is insufficient sphericity that reduces the free flow area between proppant grains; this reduces the formation fluid flow rate though the proppant pack.

The goal of disclosed invention is development a proppant facilitating the formation fluid flow due to optimization of proppant shape; the better shape increases the free flow area between channels formed by grains of packing in the fracture. This can reduce the drag for formation fluid flow.

This goal can be achieved by making a proppant from ceramic raw material sintered in the spherical shape (the deviation from perfect sphericity is less than 0.05% from the sphere's radius). The dispersion of gain radius must be at the same level as for a dragee medicine in pharmacy industry. The initial material for production is a charge of silica, alumina, aluminum silicates with additives of metal oxides (iron group) or manganese oxide. The improvement of technical result can be achieved by fractionating of the ready proppant: this enlarges the interstitial flow passages in the proppant pack. It is preferable that the ratio of maximal diameter of proppant grain to the minimal diameter of one fraction is less than 2.

The technology for production of proppants with almost perfect spherical shape is the same as for conventional proppants, except the use of dish nodulizer and other devices ensuring really spherical shape of semi-finished product after nodulizing; other necessary tools are tunnel kilns or sintering units for sintering in the fluidized bed. This equipment instead of rotating kilns guarantees the intact spherical shape of the semi-finished product.

The use of proppants with almost perfect spherical shape for hydrofracturing technology, especially with monodisperse grain size distribution and with further delivery of grains to the subterranean formation creates a uniform capillary-type network in the pack. This geometry reduces the adverse effects related to flow turbulization on irregularities of structure and described by the Forsheimer equation (1). The higher flow velocity means a higher pressure drop; therefore, the proppant pack permeability reduces. The coefficient linking the pressure drop and the flow velocity in this equation is known as a <<beta-factor>>, which describes the pore tortuosity for a fluid flow through a proppant pack.

$$\frac{\Delta P}{\Delta L} = \frac{\mu v}{k} + \beta \rho v^2 \quad (1)$$

where:
ΔP—pressure drop;
ΔL—distance between the sites of pressure measuring;
μ—liquid viscosity;
v—liquid velocity, v=q/s, where q—is the pumping rate, s—cross-section of proppant pack;
β-beta-factor;

k—permeability;
ρ—liquid density.

This theory indicates that if the proppant is manufactured from the same material, the beta-factor for a pack of perfect spheres is lower than the beta-factor for a pack of spheroids.

The use of ceramic for fabrication of proppants is better than glass: the ceramic strength is higher because of presence of crystalline phases in the composition of ceramics exceeding the strength of glassy amorphous phase. Besides, material comprising crystalline phases makes the material less sensitive to high-temperature deformation while firing (in comparison with glass forms).

The preferable method from production of this type of proppants starts from grinding and mixing of ingredients and mixture feed to a dish nodulizer and sintering in tunnel kilns on the support or in a crucible. The proppant layer height as ratio to the crucible diameter is not higher than 0.7/1, the sintered product is to be separated into fractions. The usual composition of charge is alumina and silica and, at least, one more component: magnesium oxide, calcium oxide, ferrous oxide, oxides of alkaline metals or alkaline earth metals, manganese oxide or titanium oxide. The composition of charge depends on the future application of ready proppant.

The key features of proppant production are as follows:

The ingredients (maybe, annealed) are grinded until 90% of product pass though the 63 micrometer mesh. If necessary, plasticizers and other components can be added to the mixture. The grinding process can be run for separate materials or for a mix. The ingredients are mixed partially in mills (unless the procedure of combined grinding was applied) or directly in the dish nodulizer (no blades). Since there is no blade in this design, this excludes extra deformation of grains in the apparatus, the spheres only enlarge in size. If necessary, a temporary plasticizing binding is added to the charge—the amount required to form the nuclei of spherical grains and their further growth. The regular range of temporary binding material is from 3 to 20 wt. %, and the total time for mixing and nodulizing is from 2 to 10 minutes. The binding additives are taken from classes of water, water or organic solutions of polymers, latex, microwax, wax, etc. After the sphere's nuclei are formed and the proper grain size is achieved near 12 wt. % of the initial powder feed is added into the nodulizer, and the charge keeps blending for a short time, less than 3 min. Then these grains are sorted by size with account for further shrinking while sintering stage. The out-size grains can be forwarded for recycling. If the organic temporary binders were used during the mixing and nodulizing stage, pre-annealing can be used for removal of this organics. The dried and sized grains are fed for annealing in a bed (in a sagger) or into crucibles in tunnel kilns. This approach for annealing helps avoid material deformation on this stage. The temperature and residence time are chosen to ensure the proper sintering of material as soon as the required strength is achieved. Separation into fractions is also possible after the annealing stage.

Although the technology for application of developed proppant is the same as for standard types of proppants, the use of perfectly spherical proppant can be beneficial for higher fluid production from the reservoir and for drainage to the borehole.

Here the Invention is illustrated through several examples.

Experiments were carried out on the well cluster, i.e., under identical conditions.

1. After hydrofracturing was carried out at the depth of on wells in the West Siberia area, the use of ceramic proppants with sphericity of 0.7 gives the well productivity at the level of 110 m$^3$ per day, while the estimated productivity was in the range 100-160 m$^3$ per day.
2. The use of proppant of the same composition and the same conditions, but with sphericity of 0.85, increases the well production to the level of 157 m$^3$ per day, with the estimated well productivity in the range 100-160 m$^3$ per day.
3. The use of proppant of the same composition with perfect spherical shape (deviation is less than 2% of radius) increases the well production up to 201 m$^3$ per day.

The proppant of grains with perfect spherical shape instead of proppant with 0.9 sphericity increases the well production by 25% at other equal conditions.

The invention claimed is:

1. A method of preparing proppant, the preparing comprising:
   a. providing raw material;
   b. mixing the raw materials; and,
   c. processing the raw materials through a bladeless dish nodulizer;
   wherein the proppant comprises the particulates of sintered ceramic material, and wherein the said proppant has an ideal spherical shape.

2. The method of claim 1 wherein the proppant has perfect spherical shape.

3. The proppant produced according to claim 1, wherein the proppant is separated into fractions.

4. The method of claim 1 wherein
   the deviation from perfect sphericity is less than about 0.05% from the radius of the prepared proppant.

5. The method of claim 1 wherein the raw materials comprise at least one of silica, alumina, aluminum silicates with additives of metal oxides, manganese, alkaline metal oxides, alkaline earth oxides, oxides of metals from the iron group, or manganese oxide.

6. The method of claim 4 further comprises fractioning the raw materials.

7. The method of claim 1 wherein the preparing comprises the use of a tunnel kiln.

8. The method of claim 1 wherein the preparing comprises the use of a sintering unit for sintering in a fluidized bed.

9. The method of claim 1 wherein the preparing comprises the use of a mill.

10. The method of claim 1 wherein the proppant has a monodisperse grain size distribution, and placement of the proppant to a subterranean formation forms an essentially uniform capillary-type network in a proppant pack.

* * * * *

UNITED STATES PATENT AND TRADEMARK OFFICE
CERTIFICATE OF CORRECTION

PATENT NO. : 9,145,513 B2  
APPLICATION NO. : 12/527711  
DATED : September 29, 2015  
INVENTOR(S) : Elena Tomilina and Joseph Eamonn O'Neill Page 1 of 1

It is certified that error appears in the above-identified patent and that said Letters Patent is hereby corrected as shown below:

Title Page, Item 75

First inventor is amended from "Elena Pershikova" to --Elena Tomilina--.

Signed and Sealed this
Nineteenth Day of July, 2016

Michelle K. Lee
*Director of the United States Patent and Trademark Office*